United States Patent [19]

Yeh et al.

[11] Patent Number: 4,683,648
[45] Date of Patent: Aug. 4, 1987

[54] LEAD-TITANIUM, BIPOLAR ELECTRODE IN A LEAD-ACID BATTERY

[75] Inventors: Lun-Shu R. Yeh, Summit; Morten Grenness, Califon; Robert J. Fuller, Hackettstown, all of N.J.

[73] Assignee: Allied Corporation, Morris Township, Morris County, N.J.

[21] Appl. No.: 914,422

[22] Filed: Oct. 2, 1986

Related U.S. Application Data

[62] Division of Ser. No. 684,755, Dec. 21, 1984, Pat. No. 4,637,970.

[51] Int. Cl.$^4$ ............................................. H01M 4/16
[52] U.S. Cl. .................................. 29/623.5; 429/210; 204/37.1
[58] Field of Search ...................... 204/37.1; 429/210; 29/623.5, 623.1

[56] References Cited

U.S. PATENT DOCUMENTS

| | | | |
|---|---|---|---|
| 3,439,188 | 4/1969 | Glover et al. | 204/37.1 |
| 3,497,425 | 2/1970 | Cotton et al. | 204/37.1 |
| 3,691,029 | 9/1972 | Raymond et al. | 204/37.1 |
| 3,817,788 | 6/1974 | Eckerbom et al. | 429/210 |
| 4,178,216 | 12/1979 | Nordblom et al. | 429/210 |
| 4,588,480 | 5/1986 | Thoma | 204/37.1 |
| 4,589,960 | 5/1986 | Preisler et al. | 204/37.1 |

Primary Examiner—Donald L. Walton
Attorney, Agent, or Firm—Anibal J. Cortina; Gerhard H. Fuchs

[57] ABSTRACT

A bipolar electrode for generating electrical power in an electrochemical cell includes a base member, which is comprised of a core portion composed of titanium. An integral, substantially continuous and non-porous layer of lead is electroplated onto at least one face surface of the core portion and diffused a selected distance into the core portion. A substantially continuous, residual layer of the titanium alloy in the core portion remains substantially free of lead. A negative-type active mass is connected to a first face surface of the base member, and a positive-type active mass is connected to a second face surface of the base member.

11 Claims, 5 Drawing Figures

LEAD-TITANIUM, BIPOLAR ELECTRODE IN A LEAD-ACID BATTERY

This application is a division of application Ser. No. 684,755 filed Dec. 21, 1984 now U.S. Pat. No. 4,637,970.

BACKGROUND OF THE INVENTION

1. Field of the Invention:

The present invention relates to an electrode for use in an electrochemical cell employed to produce electrical power. More particularly, the present invention relates to a bipolar electrode for use in a rechargeable lead-acid battery.

2. Brief Description of the Prior Art:

U.S. Pat. No. 3,817,788 to Eckerbom, et al. discloses a bipolar electrode which has a support wall of insulating material and two current conductors of large surface area on opposite sides of the support wall. The two current conductors are connected electrically together by a large number of through connectors which provide a substantially uniform current density throughout the current conductors. Negative active material is on one current conductor, and positive active material is on the other current conductor.

U.S. Pat. No. 4,178,216 to Nordblom, et al. discloses a bipolar electrode support structure for use in a lead acid battery. The structure is comprised of a porous matrix of valve metal impregnated with lead or a lead alloy. At least one surface of the structure has a rim portion which has little or no exposed lead.

U.S. Pat. No. 4,211,833 to Einstein discloses a bipolar battery comprised of at least two battery cells. Each battery cell is comprised of a plurality of electrodes. These electrodes are comprised of at least two cellular end plate electrodes and at least two interstitially located single pole electrodes. A continuous, sheetlike insulator is located in an alternating, woven disposition within each of the cells between all adjacent electrodes to provide electrical separation. The end plate electrodes of adjacent cells are of opposite polarity and comprise a single, bipolar electrode.

Conventional bipolar electrode devices, such as those taught by the above references, have not been completely satisfactory. Expansions and contractions of the electrode during the charge and discharge operations can cause creep distortion at the seal interface between the individual cells within the battery. A resultant distortion corrosion allows leakage of electrolyte between the cells which causes intercell discharge.

In addition, conventional bipolar electrodes have been susceptible to perforations through the thickness of the electrode. This perforation can cause intercell discharge. Insulators have been employed to prevent perforation and leakage of electrolyte, but these insulators have also undesirably reduced electrical conduction across the electrode.

SUMMARY OF THE INVENTION

The present invention provides an improved bipolar electrode for generating electrical power in an electrochemical cell apparatus. The electrode is comprised of a base member which has a core portion composed of titanium. An integral, substantially continuous and non-porous layer of lead is electroplated onto at least one face surface of the core portion and is diffused at a selected distance into the core portion face surface. A substantially continuous, residual layer of the titanium in the core portion remains substantially free of lead. A negative-type active mass is connected to a first face surface of the base member, and a positive-type active mass is connected to a second face surface of the base member.

The present invention also provides a method for producing an electrode for generating electrical power in an electrochemical cell apparatus, which includes the step of placing a core portion composed of titanium in a plating bath that contains dissolved lead ions. The dissolved lead is electroplated onto one or more faces of the core portion to produce a substantially non-porous, continuous layer of lead on the core portion faces. The electroplated core portion is heated to diffuse the lead into the core portion a limited distance which leaves a residual layer in the core portion that contains substantially zero lead.

The invention further provides an electrochemical battery apparatus for producing electrical power which includes a container for containing an electrolyte. At least one bipolar electrode for generating the electrical power is located in the container and separates the container into at least a first compartment and a second compartment. The bipolar electrode is comprised of a base member which includes a titanium core portion. An integral, substantially continuous and non-porous layer of lead is electroplated onto at least one face surface of the core portion and diffused a selected, limited distance into the core portion. A substantially continuous, residual layer in the core portion remains substantially free of lead. A negative-type active mass is connected to a first face surface of the base member, and a positive-type active mass is connected to second face surface of the base member. A positive electrode is located in the first compartment of the container, and a negative electrode is located in the second compartment of the container. Sealing means prevent leakage of electrolyte around the bipolar electrode between the first and second compartments of the container.

The improved bipolar electrode provided by the present invention advantageously resists perforation and creep corrosion. As a result, the bipolar electrode of the present invention allows construction of a battery which is lighter and capable of providing a higher discharge rate than conventional lead-acid type batteries.

BRIEF DESCRIPTION OF THE DRAWINGS

The present invention will be more fully understood and further advantages will become apparent when reference is made to the following detailed description of the preferred embodiments of the invention and the accompanying drawings in which.

DETAILED DESCRIPTION OF THE PREFERRED EMBODIMENTS OF THE INVENTION

Figure 1A:
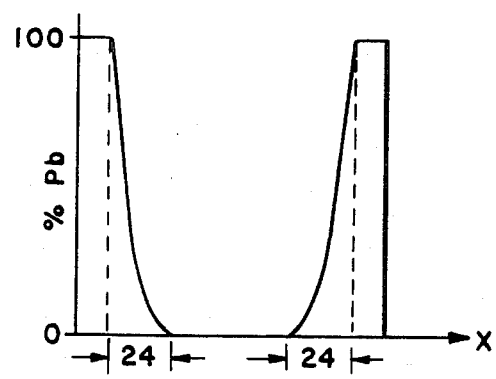
FIG. 1A representatively shows the lead concentration within a cross-section taken through the thickness of the base member of a bipolar electrode of the present invention.
Figure 1B:
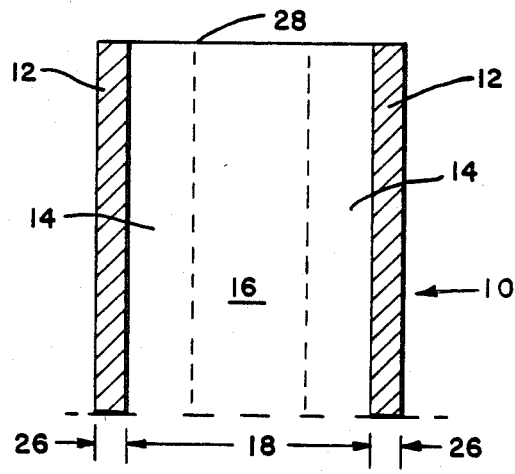
FIG. 1B representatively shows a cross-sectional view of a base member of the bipolar electrode.

FIG. 1B representatively shows a partial, cross-sectional view of base member 10. The base member is generally configured as a rectangular, flat plate or sheet, although other configurations, such as circular members or members with flat or curved surfaces, would also be suitable. Core portion 28 of base member 10 has a thickness dimension 18 which ranges from about 0.01 to 10 mm and preferably ranges from about 0.05–0.5 mm to provide improved performance. The core portion is composed of titanium (Ti) or a suitable titanium alloy, and it is intended that the term, titanium, as employed in the present specification and claims, includes suitable titanium alloys as well as substantially pure titanium. An integral, substantially continuous layer 12 of lead (Pb) is electrolytically plated onto at least one side, face surface of the titanium core portion 28. This electroplated lead layer is substantially non-porous. Electroplated core portion 28 is then heated in an inert atmosphere to a temperature of at least about 800° C. to diffuse lead a selected distance 24 into core portion 28. After this diffusion, a substantially continuous, residual layer 16 within core portion 28 remains substantially free of lead.

A ductile, graded titanium-lead base member was produced in accordance with the method of the invention by electrochemically plating lead onto a thin, ductile titanium substrate core and heat treating the plated substrate. The electroplating of lead was performed in a plating bath which included an aqueous solution of Pb $(BF_4)_2$ (lead-tetrafluoroborate) and $H_3BO_3$ (boric acid). The titanium alloy substrate was employed as the cathode during the plating operation, and a sacrificial lead anode replenished the lead cation in the solution. Coulombic efficiencies of both the cathodic deposition and the anodic dissolution of lead were approximately 100%. As a result, the concentration of lead cation in the solution was nearly constant and the deposition process involved the simple redistribution of lead from the sacrificial anode to the titanium alloy cathode. The cathodic reaction at the titanium alloy substrate caused a reduction of the titanium surface oxide layer which might otherwise have acted as a barrier against the diffusion of lead into the titanium substrate during the subsequent heat treatment.

A suitable plating bath was, for example, provided by an aqueous solution containing about one molar concentration of lead-tetrafluoroborate and about one molar concentration of boric acid.

The thermal heat treatment of the lead plated titanium core member was carried out in a lead vapor saturated chamber, which was pressurized with an inert gas, such as argon. Extra lead was placed inside the chamber to maintain a saturated lead vapor pressure. The electroplated core portion 28 was heated in the chamber to a temperature of at least about 800° C. to dissolve the lead and diffuse it into the titanium substrate. If desired, temperatures up to about 1400° C. can be employed to dissolve and diffuse the lead into the titanium. Upon cooling, some of the diffused lead may form a separate phase and transforms into $Ti_4Pb$.

FIG. 1A representatively shows the relative lead concentration profile in the diffusion layer 14 within titanium core portion 28. A titanium-lead matrix profile was obtained by a microprobe analysis at the cross-section of a reacted titanium-lead base member 10. In particular, FIG. 1A representatively shows the relative lead concentration in a lead plated core portion which was heated at 850° C. for 1 hour and then heated at 1000° C. for 2 hours. At the 1000° C. temperature, titanium also diffused into the lead to facilitate the formation of the titanium-lead diffusion layer 14.

An examination with a scanning electron microscope showed that an unreacted layer of lead was retained on the surface of base member 10, and that the lead-titanium, graded alloy diffusion layer 14 extended into the bulk of titanium core portion 28 a distance 24 which measured about 60 micrometers. An unreacted layer of titanium 16, which contained substantially zero lead, remained underneath the diffusion layer. An X-ray diffraction analysis identified the presence of $Ti_4Pb$ in the lead-titanium alloy diffusion layer.

The thickness of both the lead and the leadtitanium layers can be controlled by the heating temperature and the duration of the heating. Preferably, the initial layer 12 of electroplated lead should be about 0.1 mm thick. In particular embodiments of the invention, an expanded titanium alloy mesh can be fixed to one side of the base member 10 to facilitate the retention of positive-type active mass on the base member. Similarly, a lead alloy mesh can be affixed or otherwise connected to another side of base member 10 to facilitate the retention of negative-type active mass on the base member.

Figure 1C:
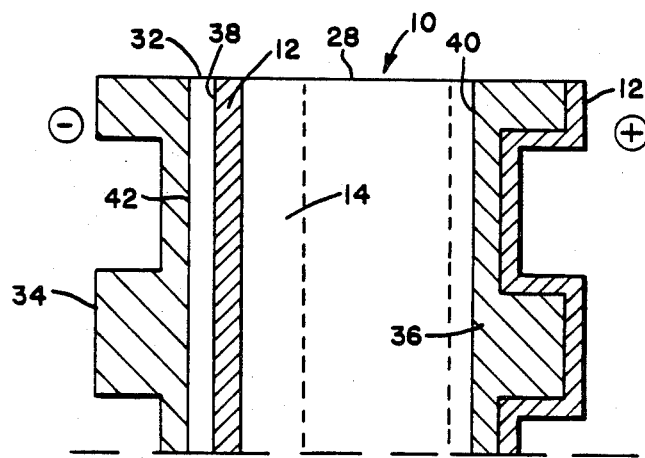
FIG. 1C representatively shows a fractional cross-sectional view of a bipolar electrode of the invention.

With reference to FIG. 1C, a particular aspect of the invention includes a base member 10, which has an additional layer of lead 32 affixed in facing relation to at least one face surface 38 of the base member. Layer 32 can be efficiently attached, for example, by hot dipping the base member into a bath of molten lead at a temperature of not more than 850° C., and preferably at a temperature ranging from about 350°–500° C. Base member 10 can also include a titanium alloy mesh 36 affixed to face surface 40 of core portion 28 prior to the lead electroplating and diffusion operations. The irregular surface provided by the mesh structure helps to support and retain a mass of a suitable active material. Similarly, a lead alloy mesh 34 can be affixed to a face surface 42 of lead layer 32 to help retain a mass of a suitable active material on the opposite side of the bipolar electrode.

Figure 2:
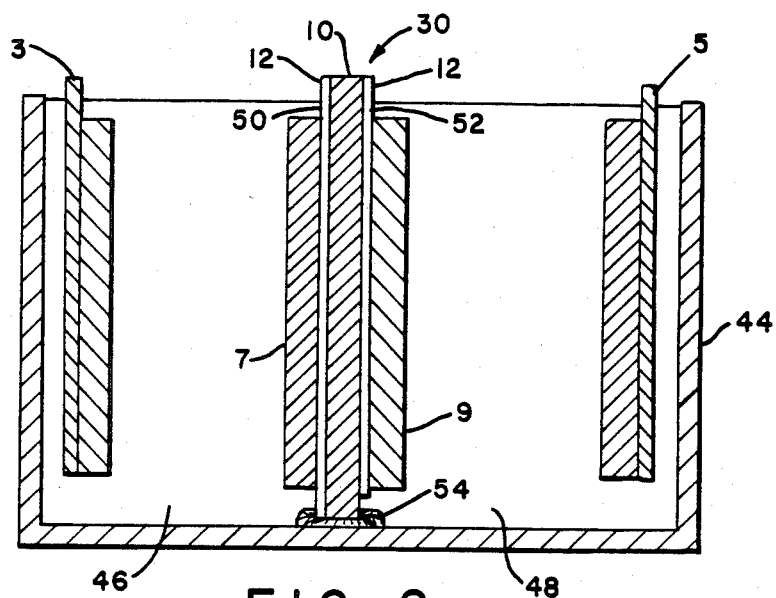
FIG. 2 representatively shows an electrical battery which includes a bipolar electrode of the invention.

In accordance with the present invention, the distinctive bipolar electrode can be employed to construct an improved electrochemical battery for producing electrical power, as illustrated in FIG. 2. This battery includes a container 44 for containing an electrolyte, such as sulfuric acid, and includes at least one bipolar electrode 30 for generating electrical power. The bipolar electrode separate container 44 into a first compartment 46 and a second compartment 48, and is comprised of a base member 10. The base member includes a titanium core portion which has an integral, substantially continuous and non-porous layer of lead 12 electroplated onto at least one and preferably both face surfaces thereof. These lead layers are thermally diffused at a selected, limited distance into the core portion. As a result, a substantially continuous, residual layer of titanium in the core portion remains substantially free of lead. A negative-type active mass 7 connects to a first face surface 50 of base member 10, and positive-type active mass 9 connects to a second face surface 52 of the base member. A positive electrode 3 is located in first compartment 46 of container 44, and a megative electrode 5 is located in the second compartment 48 of the container. Sealing means 54 prevents leakage of electrolyte around bipolar electrode 30 between first compartment 46 and second compartment 48. Lead layer 12 below positive-type active mass 9 is removed prior to assembly to improve sealing.

In the above-described structure, bipolar electrode 30 acts as the separator or septum between the two electrochemical cells delimited by the two compartments 46 and 48. These two cells are effectively connected in series, and it is readily apparent that additional bipolar electrodes can be added to further divide container 44 into additional, series connected electrochemical cells. For example, if three bipolar electrodes are employed in a lead-acid battery, the assembly would produce a 8-volt battery having four cells.

When compared to conventional lead-acid batteries the battery of the present invention can provide a higher current discharge rate because electrical current can flow between the cells along a conductive path through the thickness of each of the bipolar electrodes. The cross-sectional area of this conductive path is essentially the entire plate surface area of the bipolar electrode. This increased cross-sectional area advantageously reduces the resistance to current flow and allows the higher discharge rate. When compared to batteries having conventional bipolar electrode structures, the battery of the invention has an improved bipolar electrode that provides increased resistance to creep corrosion and perforation.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A bipolar, lead-acid battery was built in a polystyrene box. The battery was a four-volt design and included a bipolar plate, a positive end plate and a negative end plate. The substrates for all three of the plate electrodes were composed of graded, titanium-lead base members. Initially, a piece of expanded titanium mesh, material manufactured by Exmet Corporation located at Bridgeport, Connecticut, was spot welded onto one side of the titanium sheets employed for the positive and the negative electrodes. A titanium mesh was spot welded onto both sides of the titanium sheet employed for the bipolar electrode. The titanium sheets along with the affixed titanium meshes were then electroplated with lead. Extra lead was electroplated onto the negative electrode to better protect the titanium-lead alloy. The electrodes were then heated at a temperature of 900° C. for a time period of about 10 hours to produce a diffusion layer 14 of lead in the titanium. Suitable positive and negative active masses were applied, as required, on the electrodes employing conventional pasting procedures.

A positive electrode composed of lead or lead-rich alloy will corrode even at the interface where it is sealed. To prevent this creeping corrosion problem, the edges of the base member on the positive side of the bipolar electrode were ground to remove lead and lead-rich alloy and improve sealing. A sealing means composed of a stop-off lacquer was employed for the inter-cell sealing within the polystyrene container. The bipolar electrode was glued into place with the lacquer at approximately the center of the container, thereby dividing the container into a first compartment and a second compartment. The positive electrode and negative electrode were each placed into its appropriate compartment to provide two-cell, four-volt battery. The first compartment of the battery contained the positive electrode and the negative side of the bipolar electrode, and the second compartment contained the negative electrode and the positive side of the bipolar electrode.

The sealing around the edges of the bipolar electrode plate member was very important. If even a small pinhole exists, electrolyte will move between the two neighboring cells and cause self-discharge of the battery.

EXAMPLE 2

Figure 3:
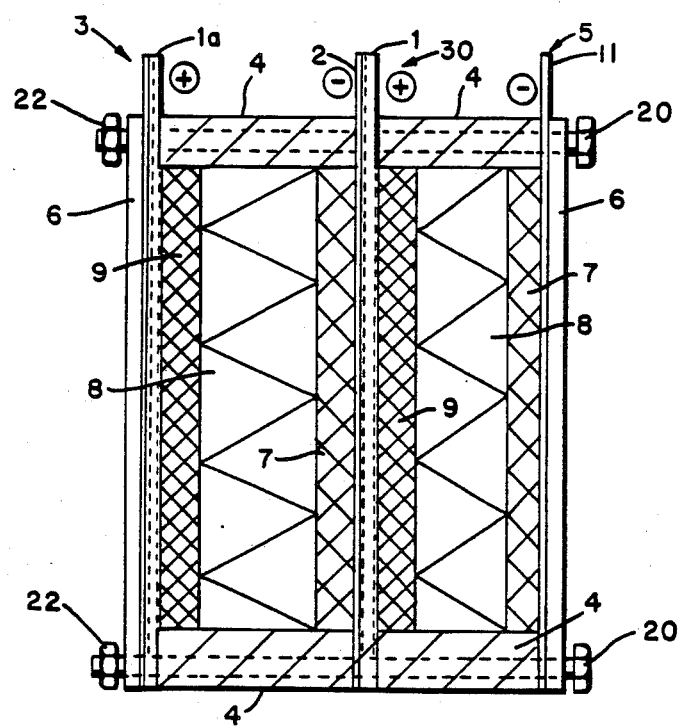
FIG. 3 representatively shows another embodiment of the electrical battery of the invention.

FIG. 3 representatively shows a bipolar battery of the invention which had a filter-press-cell configuration. This configuration eliminated sealing procedures which require a glue-type sealant. The battery was a two-cell, four-volt battery and included two end plate members 6, a bipolar electrode 30, a positive electrode 3 and a negative electrode 5. Spacers 8 separated the negative electrode 5 and positive electrode 3 from the bipolar electrode 30 and formed a sandwich structure therewith. As representatively shown in FIG. 3, a spacer 8 was located between positive electrode 3 and the negative side of bipolar electrode 30. Another spacer was positioned between negative electrode 5 and the positive side of bipolar electrode 30. Gasket members 4 had the general configuration of a rectangular "doughnut", the sides of which formed the side walls of the battery container and the central, window opening of which contained the battery sulfuric acid electrolyte. Bolts 20 extended through end plates 6 and were fastened with nuts 22 to compress the sandwiched assembly of electrodes, spacers and gaskets together. Appropriate provisions were made to prevent bolt 20 from short circuiting the electrodes. A positive active mass 9 composed of lead oxide was affixed to positive electrode 3 and a negative active mass material 7 was affixed to lead layer 11 of negative electrode 5. A positive active mass 9 was affixed to the positive side of bipolar electrode 30, and a negative active mass 7 was affixed to a lead layer 2, which, in turn, was arranged to form the negative side of bipolar electrode 30. End plates 6 and spacers 8 were composed of a suitable material, such as polypropylene, and gaskets 4 were composed of a suitable sealing type material such as rubber. The described configuration produced a flooded-type, lead-acid battery.

In this particular battery construction, an expanded titanium mesh was spot welded onto one side of each of the titanium sheets 1 and 1a prior to the lead plating operation. These titanium meshes supported the active masses 9 for the positive portion of the bipolar electrode 30 and for the positive end electrode 3. Conventional, expanded, lead-calcium alloy meshes, which were spot welded onto one side of each of the lead layer portions 11 and 2, provided support for the negative active masses 7 applied to negative end electrode 5 and to the negative portion of bipolar electrode 30.

The bipolar electrode was comprised of a positive plate and a negative plate placed back-to-back in electrically conductive communication with each other. The positive plate was comprised of the spot welded assembly of the titanium mesh and titanium sheet 1. This assembly was subsequently electroplated and diffused with lead. The negative plate was comprised of the spot welded assembly of lead sheet 2 and the lead alloy mesh.

A polyethylene, Vexar, net material 8 (manufactured by DuPont) was placed between the bipolar electrode 30 and each of the two end electrodes as a spacer to prevent shorting. The positive active mass 9 was composed of conventional lead oxide paste, and the negative active mass 7 was composed of a conventional lead oxide and an expander familiar to the lead acid battery art.

After construction, the battery was first formed and then discharged at 120 mA until the voltage dropped to 3.5 V. The battery was then charged at a constant current of 120 mA until the battery reached a preset cutoff voltage of 5.5 V. The battery delivered 0.5 ampere hours (Ah) in the first cycle and delivered 0.68 Ah at the fifth cycle, which corresponded to approximately 32% of the theoretical utilization. During further testing through a total of 110 cycles, the capacity dropped off as the number of cycles increased, but the battery did not exhibit creep corrosion or intercell leakage.

EXAMPLE 3

A second, modified battery was constructed to investigate means for improving battery performance. The battery configuration was generally similar to the configuration described in Example 2. Modifications included increased spacing between the bipolar electrode and the end electrodes, and included a compressive stress applied to the positive electrodes. In particular, the battery included a Daramic separator placed between the bipolar electrode and each of the positive and negative end electrodes to prevent electrical shorting. In addition, a layer of glass fiber mat, similar to that employed in an immobilized electrolyte system battery, was placed next to the active mass of positive end electrode 3 and next to the active mass of the positive portion of bipolar electrode 30. Polyethylene, Vexar, spacers placed on both sides of the Daramic spacer provided a compressive force which pressed the glass fiber mat against the positive active masses on the electrodes.

The battery reached fifty-six percent theoretical utilization at the fourth cycle, when tested under a five hour discharge rate, and did not exhibit creep corrosion or intercell leakage through 110 test cycles.

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. A method for producing an electrode for generating electrical power in an electrochemical cell apparatus, comprising the steps of:
   (a) placing a core portion composed of titanium in a plating bath which contains dissolved lead (Pb) ions; (b) electroplating said dissolved lead onto one or more faces of said core portion member to produce a substantially non-porous, continuous layer of lead on said core portion faces; and
   (c) heating said electroplated core portion to diffuse said lead into said core portion a limited distance which leaves a residual layer in said core portion that contains substantially zero lead.

2. A method as recited in claim 1, wherein said plating bath consists essentially of an aqueous solution of Pb(BF$_4$)$_2$ (lead-tetrafluoroborate) and H$_3$BO$_3$ (boric acid), and contains a sacrificial, lead bearing anode.

3. A method as recited in claim 2, wherein said plating bath consists essentially of an aqueous solution which includes about 1 molar lead-tetrafluoroborate and about 1 molar boric acid.

4. A method as recited in claim 1, wherein said heating step (c) includes the step of heating said electroplated core portion to a temperature of at least about 800° C. in an inert gas atmosphere which is substantially saturated with lead vapor.

5. A method as recited in claim 4, wherein said temperature ranges from about 800°–1400° C.

6. A method as recited in claim 1, further comprising the step of affixing a titanium mesh to one or more of said core portion faces prior to said electroplating step (b).

7. A method as recited in claim 6, further comprising the step of applying an active mass composed of lead oxide onto said titanium mesh structure.

8. A method as recited in claim 1, further comprising the steps of:
   (a) affixing a titanium alloy mesh onto a face surface of said core portion prior to said electroplating step (b); and
   (b) affixing an additional layer of lead onto an opposite face surface of said electroplated core portion.

9. A method as recited in claim 8, wherein said additional layer of lead is affixed by dipping said electroplated core portion in a bath of molten lead.

10. A method as recited in claim 9, wherein said bath of molten lead is at a temperature of not more than 850° C.

11. A method as recited in claim 9, wherein said bath of molten lead is at a temperature ranging from about 350°–500° C.

* * * * *